United States Patent
Miftakhov (10) Patent No.: US 12,341,225 B2
(45) Date of Patent: Jun. 24, 2025

(54) INTEGRATED HYDROGEN-ELECTRIC ENGINE

(71) Applicant: ZeroAvia, Inc., Hollister, CA (US)

(72) Inventor: Valery Miftakhov, San Carlos, CA (US)

(73) Assignee: ZEROAVIA, INC., Hollister, CA (US)

( * ) Notice: Subject to any disclaimer, the term of this patent is extended or adjusted under 35 U.S.C. 154(b) by 109 days.

(21) Appl. No.: 16/950,735

(22) Filed: Nov. 17, 2020

(65) Prior Publication Data

US 2021/0151783 A1 May 20, 2021

Related U.S. Application Data

(60) Provisional application No. 63/076,382, filed on Sep. 10, 2020, provisional application No. 62/936,627, (Continued)

(51) Int. Cl.
*H01M 8/04701* (2016.01)
*H01M 8/04029* (2016.01)
(Continued)

(52) U.S. Cl.
CPC ... *H01M 8/04731* (2013.01); *H01M 8/04029* (2013.01); *H01M 8/04111* (2013.01); (Continued)

(58) Field of Classification Search
CPC .... B60L 50/70; B60L 2200/10; H01M 8/247; H01M 8/248; H01M 8/04007; (Continued)

(56) References Cited

U.S. PATENT DOCUMENTS 3,801,372 A 4/1974 Shaw
5,106,035 A 4/1992 Langford
(Continued)

FOREIGN PATENT DOCUMENTS

CN 201048143 Y 4/2008
DE 19821952 A1 11/1999
(Continued)

OTHER PUBLICATIONS

General Electric Aviation, "The Single-Spool Core: A proven design for performance and simplicity", t901-white-paper.pdf, retrieved Jun. 15, 2022 https://web.archive.org/web/20170630095803/https://www.geaviation.com/sites/default/files/single-vs-dual-spool.pdf (Year: 2017).*

(Continued)

*Primary Examiner* — Matthew T Martin
*Assistant Examiner* — Jared Hansen
(74) *Attorney, Agent, or Firm* — Osha Bergman Watanabe & Burton LLP (57) ABSTRACT

An integrated hydrogen-electric engine including an air compressor system, a hydrogen fuel source, a fuel cell stack, a heat exchanger, an elongated shaft, and a motor assembly. The heat exchanger is disposed in fluid communication with the hydrogen fuel source and the fuel cell stack. The elongated shaft supports the air compressor system, the fuel cell stack and the heat exchanger. The motor assembly is disposed in electrical communication with the fuel cell stack.

33 Claims, 3 Drawing Sheets

Related U.S. Application Data filed on Nov. 18, 2019, provisional application No. 62/936,626, filed on Nov. 18, 2019, provisional application No. 62/936,623, filed on Nov. 18, 2019, provisional application No. 62/936,625, filed on Nov. 18, 2019, provisional application No. 62/936,621, filed on Nov. 18, 2019, provisional application No. 62/936,622, filed on Nov. 18, 2019, provisional application No. 62/936,506, filed on Nov. 17, 2019, provisional application No. 62/936,510, filed on Nov. 17, 2019, provisional application No. 62/936,513, filed on Nov. 17, 2019, provisional application No. 62/936,507, filed on Nov. 17, 2019, provisional application No. 62/936,514, filed on Nov. 17, 2019, provisional application No. 62/936,505, filed on Nov. 17, 2019, provisional application No. 62/936,508, filed on Nov. 17, 2019, provisional application No. 62/936,511, filed on Nov. 17, 2019.

(51) Int. Cl.
 H01M 8/04111 (2016.01)
 H01M 8/04746 (2016.01)
 H01M 8/248 (2016.01)

(52) U.S. Cl.
 CPC ... *H01M 8/04738* (2013.01); *H01M 8/04776* (2013.01); *H01M 8/248* (2013.01); *H01M 2250/20* (2013.01)

(58) Field of Classification Search
 CPC ......... H01M 8/04029; H01M 8/04111; H01M 8/04731; H01M 8/04738; H01M 8/04776; H01M 2250/20; Y02E 60/50; Y02T 90/16; Y02T 90/40
 See application file for complete search history.

(56) References Cited

U.S. PATENT DOCUMENTS

| | | | |
|---|---|---|---|
| 5,810,284 A | 9/1998 | Hibbs et al. | |
| 6,119,979 A | 9/2000 | Lee et al. | |
| 6,322,915 B1 | 11/2001 | Collins et al. | |
| 6,380,637 B1* | 4/2002 | Hsu | B60L 58/34 290/1 R |
| 6,568,633 B2 | 5/2003 | Dunn | |
| 2001/0018138 A1 | 8/2001 | Iwase | |
| 2002/0005454 A1 | 1/2002 | MacCready et al. | |
| 2003/0096148 A1* | 5/2003 | Edwards | H01M 8/242 429/444 |
| 2004/0043267 A1* | 3/2004 | Schuler | H01M 8/2432 429/440 |
| 2004/0228055 A1 | 11/2004 | Pearson | |
| 2006/0093883 A1* | 5/2006 | Pristash | H01M 8/04291 429/479 |
| 2007/0160887 A1* | 7/2007 | Eickhoff | F16K 11/074 429/444 |
| 2007/0254200 A1* | 11/2007 | Takada | H01M 8/026 429/457 |
| 2008/0145716 A1 | 6/2008 | Yu et al. | |
| 2009/0212634 A1 | 8/2009 | Kojima et al. | |
| 2009/0293494 A1* | 12/2009 | Hoffjann | B64D 27/24 60/718 |
| 2012/0189875 A1* | 7/2012 | Fischel | B01J 14/005 429/7 |
| 2014/0047814 A1* | 2/2014 | Steinwandel | H01M 8/04111 60/39.12 |
| 2015/0357658 A1* | 12/2015 | Kashyap | H01M 8/2457 310/67 R |
| 2016/0181641 A1* | 6/2016 | Hoffjann | H01M 8/1007 429/8 |
| 2017/0175565 A1* | 6/2017 | Sennoun | F02C 6/10 |
| 2017/0211474 A1* | 7/2017 | Sennoun | F02C 6/00 |
| 2018/0053950 A1* | 2/2018 | Buehler | H01M 8/04268 |
| 2018/0304753 A1* | 10/2018 | Vondrell | B64C 21/06 |
| 2021/0043961 A1* | 2/2021 | Itou | H01M 8/04201 |
| 2021/0155476 A1* | 5/2021 | Futerman | B01J 19/18 |
| 2023/0352936 A1 | 11/2023 | Miftakhov | |

FOREIGN PATENT DOCUMENTS

| | | | |
|---|---|---|---|
| EP | 2878795 A1 | | 6/2015 |
| EP | 3199791 A1 | | 8/2017 |
| JP | H-11200888 A | * | 7/1999 |
| JP | 201917792 A | * | 7/2019 |
| KR | 20200064492 A | | 6/2020 |
| WO | 2022056107 A1 | | 3/2022 |

OTHER PUBLICATIONS

Petrescu, Relly Victoria, et al. "Modern propulsions for aerospace—a review." Journal of Aircraft and Spacecraft Technology 1.1 (2017) (Year: 2017).*
Fernandes, M. D., et al. "SOFC-APU systems for aircraft: A review." International Journal of Hydrogen Energy 43.33 (2018): 16311-16333 (Year: 2018).*
JP2019117792A, machine English translation, Randell Mills, "Power Generation System and Method Regarding to the Same System", Date: Jun. 15, 2022 retrieved from https://worldwide.espacenet.com/ (Year: 2019).*
Ji, Zhixing, et al. "Thermodynamic analysis of a solid oxide fuel cell jet hybrid engine for long-endurance unmanned air vehicles." Energy Conversion and Management 183 (2019): 50-64 (Year: 2019).*
U.S. Appl. No. 17/669,327, filed Oct. 2022, Miftakhov; Valery.*
Song, Tae Won, et al. "Performance analysis of a tubular solid oxide fuel cell/micro gas turbine hybrid power system based on a quasi-two dimensional model." Journal of Power Sources 142.1-2 (2005): 30-42 (Year: 2005).*
JPH11200888A, Kishi, "Fuel cell type turbine engine", machine English translation retrieved from https://worldwide.espacenet.com/ Date: Nov. 28, 2023 (Year: 1999).*
Hendrick, Patrick, et al. "Air-hydrogen heat exchangers for advanced space launchers." Journal of propulsion and power 25.6 (2009): 1211-1219 (Year: 2009).*
Alhazmi, Nahla Eid. Thermal conductivity of proton exchange membrane fuel cell components. University of Leeds, 2014 (Year: 2014).*
Cassir, M., et al. "Electrochemical devices for energy: Fuel cells and electrolytic cells." Handbook of membrane reactors. Woodhead Publishing, 2013. 553-606 (Year: 2013).*
Extended European Search Report for Application No. 20208430.7 dated Apr. 13, 2021.
Zhixing et al.., Comparative performance analysis of solid oxide fuel cell turbine-less jet engines for electric propulsion airplanes: Application of alternative fuel , Aerospace Science and Technology, Elsevier Masson, FR, vol. 93, Jul. 10, 2019.
Sharon Thomas and Marcia Zalbowitz, "Fuel Cells—Green Power".
ISA/EP, Search Report for International Application No. PCT/US21/49635, 11 pages, Dec. 3, 2021.
ISA/EP, International Search Report and Written Opinion for International Application No. PCT/US2023/070460, 9 pages, Oct. 19, 2023.

* cited by examiner

INTEGRATED HYDROGEN-ELECTRIC ENGINE

CROSS REFERENCE TO RELATED APPLICATIONS

This application claims the benefit of U.S. Provisional Application Ser. No. 62/936,505, filed Nov. 17, 2019, U.S. Provisional Application Ser. No. 62/936,506, filed Nov. 17, 2019, U.S. Provisional Application Ser. No. 62/936,507, filed Nov. 17, 2019, U.S. Provisional Application Ser. No. 62/936,508, filed Nov. 17, 2019, U.S. Provisional Application Ser. No. 62/936,510, filed Nov. 17, 2019, U.S. Provisional Application Ser. No. 62/936,511, filed Nov. 17, 2019, U.S. Provisional Application Ser. No. 62/936,513, filed Nov. 17, 2019, U.S. Provisional Application Ser. No. 62/936,514, filed Nov. 17, 2019, U.S. Provisional Application Ser. No. 62/936,621, filed Nov. 18, 2019, U.S. Provisional Application Ser. No. 62/936,622, filed Nov. 18, 2019, U.S. Provisional Application Ser. No. 62/936,623, filed Nov. 18, 2019, U.S. Provisional Application Ser. No. 62/936,625, filed Nov. 18, 2019, U.S. Provisional Application Ser. No. 62/936,626, filed Nov. 18, 2019, U.S. Provisional Application Ser. No. 62/936,627, filed Nov. 18, 2019, and U.S. Provisional Application Ser. No. 63/076,382, filed Sep. 10, 2020, the entire contents of each of which are incorporated by reference herein.

TECHNICAL FIELD

This disclosure relates to clean energy-based air propulsion systems, and more particularly, to integrated hydrogen-electric engines such as for aircraft transportation systems.

BACKGROUND

According to numbers from the FAA, the number of pilot licenses issued every year is increasing. The largest collection of licenses is in the private category. Contributing to this pattern, the lowest barrier of entry into private aviation is through the use of small single engine aircraft. These aircraft usually employ a single piston gasoline engine as the primary method of forward propulsion. Coincidentally, these small single engine aircraft contribute the highest number of safety infractions and accidents in general aviation. A number of factors drive these statistics, with one of the large contributors being the fact that a vast majority of these general aviation aircraft have only one engine. In case of failure of that single engine, the aircraft encounters a seriously hazardous condition and has to land immediately. If such event occurs over mountains terrain, at night, or in the Instrumental Meteorological Conditions (IMC), the outcome is often tragic.

Another contributing factor to this issue is the fact that a traditional internal combustion aviation engine contains a large number of moving parts with a low level of integration and which operate under large mechanical and thermal stresses. This unnecessarily adds weight and volume to the aircraft, negatively affects reliability of components, significantly limits useful life of the engines, increases environmental pollution, and increases probability of failure per hour of operation. As a result, the aircraft operators are forced to perform frequent and extensive maintenance of the engines on their fleet, driving the cost of operating traditionally-powered aircraft, and, in turn, drive the cost of air transportation to the end user.

In the commercial aviation market, the high maintenance and fuel costs for the traditional turbine engines drive operating costs for the airlines and other types of operators. Additionally, the continued growth of fossil fuel aviation is increasingly contributing to the particulate pollution around the airports, increased reliance on fossil fuel extraction, as well as the growing climate change impacts. The highspeed exhaust gases of the traditional turbine engines contribute significantly to the extremely large noise footprint of the commercial aviation, especially in the densely populated areas.

In the surveillance and defense applications, the high engine and exhaust temperatures significantly hamper the ability of aircraft to avoid detection and therefore reduce the mission capabilities of the aircraft.

SUMMARY

In order to overcome the foregoing challenges, this disclosure details a highly integrated hydrogen-electric engine that reduces aircraft noise and heat signatures, improves component reliability, increases the useful life of the engine, limits environmental pollution, and decreases the probability of failure per hour of operation. In particular, this disclosure details an integrated turboshaft engine with a multi-stage compressor similar to current turboshaft engines in the front, but with the remaining components replaced with a fuel cell system that utilizes compressed air and compressed hydrogen to produce electricity that runs motors on an elongated shaft to deliver useful mechanical power to a propulsor (e.g., a fan or propeller). Part of the generated power can be utilized to drive the multi-stage compressor. This architecture delivers very high-power density and is able to deliver similar power density to modern jet engines (e.g., 6-8 kW/kg) at precompression ratio of 30+ (common in today's turbofan engines).

In accordance with an aspect, this disclosure is directed to an integrated hydrogen-electric engine including an air compressor system, a hydrogen fuel source, a fuel cell stack, a heat exchanger, an elongated shaft, and a motor assembly. The heat exchanger is disposed in fluid communication with the hydrogen fuel source and the fuel cell stack. The elongated shaft supports the air compressor system, the fuel cell stack, and the heat exchanger. The motor assembly is disposed in electrical communication with the fuel cell stack.

In aspects of this disclosure, the motor assembly may include one or more motors that are disposed in coaxial alignment with the elongated shaft. The one or more motors may be actuatable to rotate the elongated shaft. Rotation of the one or more motors may cause the air compression system to compress air for transmitting the compressed air to the heat exchanger.

In aspects of this disclosure, the motor assembly includes one or more inverters disposed in electrical communication with the one or more motors and the fuel cell stack. The inverter may be configured to convert direct current from the fuel cell stack into alternating current that actuates the one or more motors.

In aspects of this disclosure, the integrated hydrogen-electric engine may further comprise a propulsor supported on a distal end of the elongated shaft.

In aspects of this disclosure, the air compressor system may include a plurality of spaced-apart compressor wheels that rotate in response to rotation of the elongated shaft. These can be implemented as axial or centrifugal compressor stages. Further, the compressor can have one or more bypass valves and/or wastegates to regulate the pressure and flow of the air that enters the downstream fuel cell, as well as to manage the cold air supply to any auxiliary heat exchangers in the system.

In aspects of this disclosure, the air compressor system may include a compressor that is mechanical coupled to the elongated shaft via a gearbox.

In aspects of this disclosure, the integrated hydrogen-electric engine may further comprise a pump in fluid communication with the hydrogen fuel source and the heat exchanger. The pump may be configured to pump liquid hydrogen from the hydrogen fuel source to the heat exchanger.

In aspects of this disclosure, the fuel cell stack may be disposed concentrically about the elongated shaft.

In aspects of this disclosure, the integrated hydrogen-electric engine may further comprise a controller disposed in electrical communication with one or more of the air compressor system, the hydrogen fuel source, the fuel cell stack, the heat exchanger, or the motor assembly.

In aspects of this disclosure, the motor assembly may include a plurality of motors and a plurality of inverters. At least one inverter of the plurality of inverters may be disposed between two motors of the plurality of motors to define a motor subassembly. At least one motor of the plurality of motors and at least one inverter of the plurality of inverters may be thermally interfaced.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying figures of which.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

Figure 1:
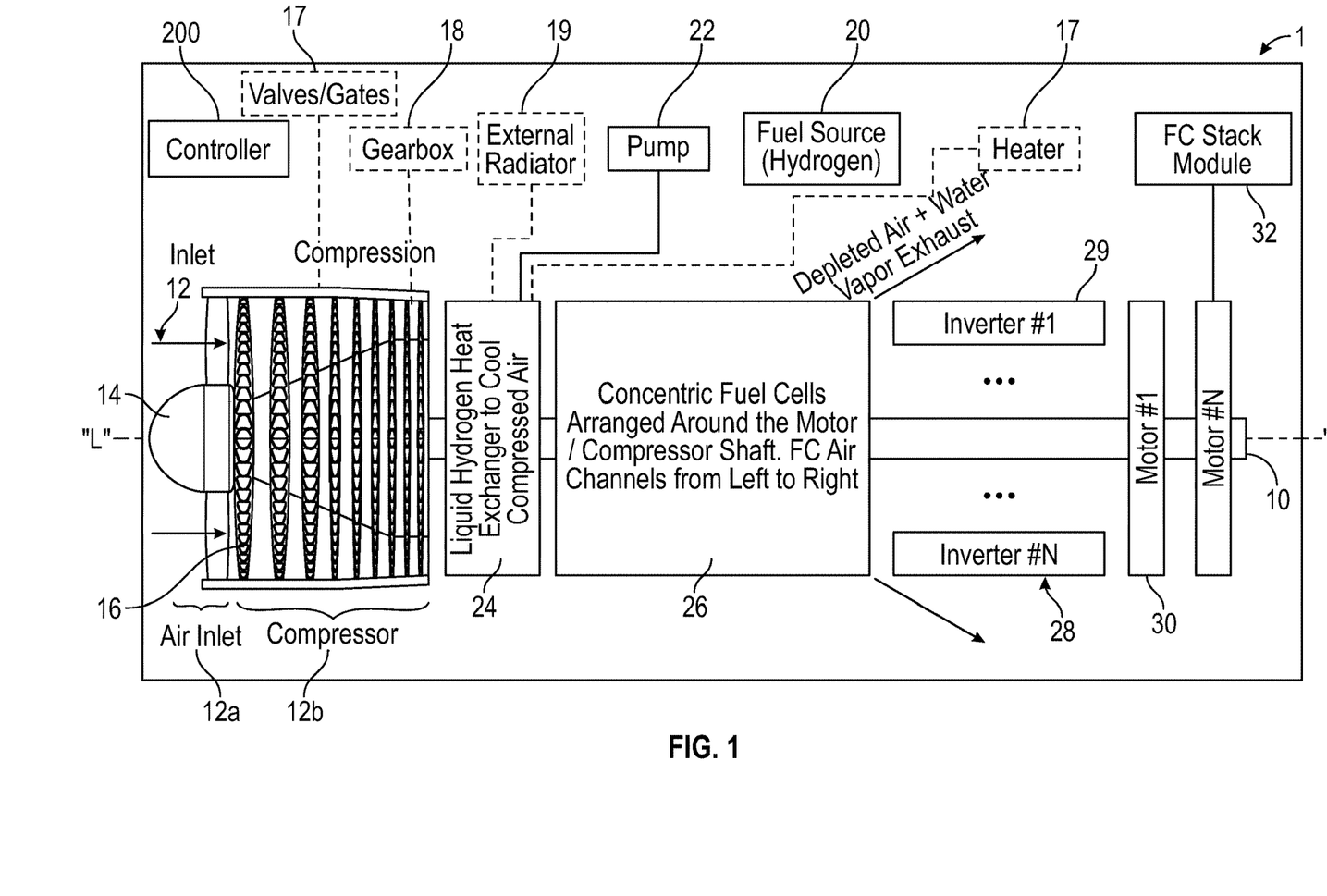
FIG. 1 is a schematic view of an integrated hydrogen-electric engine system in accordance with the principles of this disclosure.

FIG. 1 illustrates integrated hydrogen-electric engine system 1 that can be utilized, for example, in a turboprop or turbofan system, to provide a streamlined, light weight, power dense and efficient system. In general, integrated hydrogen-electric engine system 1 includes an elongated shaft 10 that defines a longitudinal axis "L" and extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump 22 in fluid communication with a fuel source (e.g., hydrogen), a heat exchanger 24 in fluid communication with air compressor system 12, a fuel cell stack 26 in fluid communication with heat exchanger 24, and a motor assembly 28 disposed in electrical communication with fuel cell stack 26.

Air compressor system 12 of integrated hydrogen-electric engine system 1 includes an air inlet portion 12a at a distal end thereof and a compressor portion 12b that is disposed proximally of air inlet portion 12a for uninterrupted, axial delivery of air flow in the proximal direction. Compressor portion 12b supports a plurality of longitudinally spaced-apart rotatable compressor wheels 16 (e.g., multi-stage) that rotate in response to rotation of elongated shaft 10 for compressing air received through air inlet portion 12a for pushing the compressed air to a fuel cell stack 26 for conversion to electrical energy. As can be appreciated, the number of compressor wheels/stages 16 and/or diameter, longitudinal spacing, and/or configuration thereof can be modified as desired to change the amount of air supply, and the higher the power, the bigger the propulsor 14. These compressor wheels 16 can be implemented as axial or centrifugal compressor stages. Further, the compressor can have one or more bypass valves and/or wastegates 17 to regulate the pressure and flow of the air that enters the downstream fuel cell, as well as to manage the cold air supply to any auxiliary heat exchangers in the system.

Compressor 12 can optionally be mechanically coupled to elongated shaft 10 via a gearbox 18 to change (increase and/or decrease) compressor turbine rotations per minute (RPM) and to change the air flow to fuel cell stack 26. For instance, gearbox 18 can be configured to enable the air flow, or portions thereof, to be exhausted for controlling a rate of air flow through the fuel cell stack 26, and thus, the output power.

Integrated hydrogen-electric engine system 1 further includes a gas management system such as a heat exchanger 24 disposed concentrically about elongated shaft 24 and configured to control thermal and/or humidity characteristics of the compressed air from air compressor system 12 for conditioning the compressed air before entering fuel cell stack 26. Integrated hydrogen-electric engine system 1 further also includes a fuel source 20 of fuel cryogenic (e.g., liquid hydrogen—LH2, or cold hydrogen gas) that is operatively coupled to heat exchanger 24 via a pump 22 configured to pump the fuel from fuel source 20 to heat exchanger 24 for conditioning compressed air. In particular, the fuel, while in the heat exchanger 24, becomes gasified because of heating (e.g., liquid hydrogen converts to gas) to take the heat out of the system. The hydrogen gas then get heated in the heat exchanger 24 to a working temperature of the fuel cell 26 which also takes heat out of the compressed air, which results in a control of flow through the heat exchanger 24. In embodiments, a heater 17 can be coupled to or included with heat exchanger 24 to increase heat as necessary, for instance, when running under a low power regime. Additionally, and/or alternatively, motor assembly 28 can be coupled to heat exchanger 24 for looping in the cooling/heating loops from motor assembly 28 as necessary. Such heating/cooling control can be managed, for instance, via controller 200 of integrated hydrogen-electric engine system 1. In embodiments, fuel source 20 can be disposed in fluid communication with motor assembly 28 or any other suitable component to facilitate cooling of such components.

Pump 22 can also be coaxially supported on elongated shaft 10 for actuation thereof in response to rotation of elongated shaft 10. Heat exchanger 24 is configured to cool the compressed air received from air compressor system 12 with the assistance of the pumped liquid hydrogen.

Figure 2:
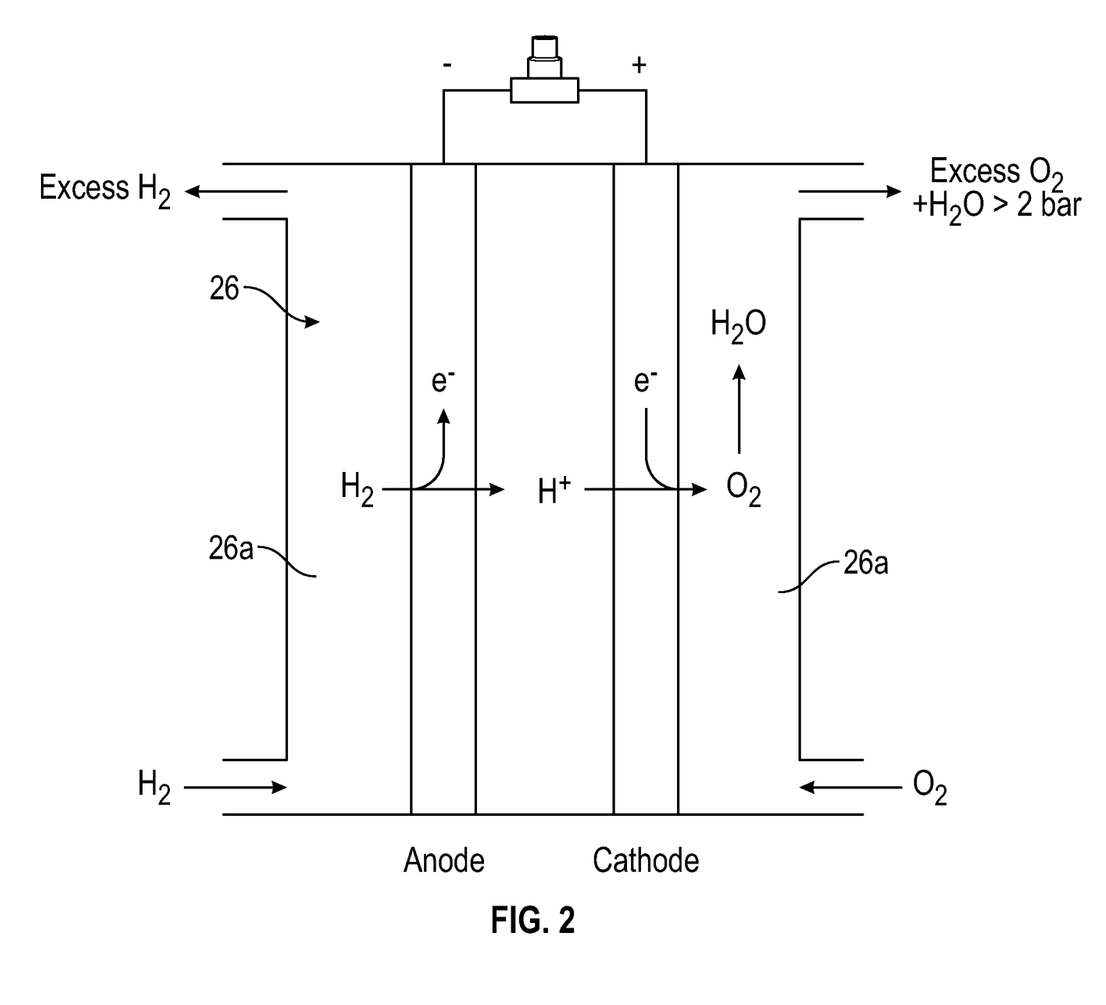
FIG. 2 is a schematic view of a fuel cell of the integrated hydrogen-electric engine system of FIG. 1.

With reference also to FIG. 2, integrated hydrogen-electric engine system 1 further includes an energy core in the form of a fuel cell stack 26, which may be circular, and is also coaxially supported on elongated shaft 10 (e.g., concentric) such that air channels 26a of fuel cell stack 26 may be oriented in parallel relation with elongated shaft 10 (e.g., horizontally or left-to-right). Fuel cell stack 26 may be in the form of a proton-exchange membrane fuel cell (PEMFC). The fuel cells of the fuel cell stack 26 are configured to convert chemical energy liberated during the electrochemical reaction of hydrogen and oxygen to electrical energy (e.g., direct current). Depleted air and water vapor are exhausted from fuel cell stack 26. The electrical energy generated from fuel cell stack 26 is then transmitted to motor assembly 28, which is also coaxially/concentrically supported on elongated shaft 10. In aspects, integrated hydrogen-electric engine system 1 may include any number of external radiators 19 (FIG. 1) for facilitating air flow and adding, for instance, additional cooling. Notably, fuel cell stack 26 can include liquid cooled and/or air cooled cell types that so that cooling loads are integrated into heat exchanger 28 for reducing total amount of external radiators needed in the system.

Motor assembly 28 of integrated hydrogen-electric engine system 1 includes a plurality of inverters 29 configured to convert the direct current to alternating current for actuating one or more of a plurality of motors 30 in electrical communication with the inverters 29. The plurality of motors 30 are configured to drive (e.g., rotate) the elongated shaft 10 in response to the electrical energy received from fuel cell stack 26 for operating the components on the elongated shaft 10 as elongated shaft 10 rotates.

In aspects, one or more of the inverters 29 may be disposed between motors 30 (e.g., a pair of motors) to form a motor subassembly, although any suitable arrangement of motors 30 and inverters 29 may be provided. The motor assembly 28 can include any number of motor subassemblies supported on elongated shaft 10 for redundancy and/or safety. Motor assembly 28 can include any number of fuel cell stack modules 32 configured to match the power of the motors 30 and the inverters 29 of the subassemblies. In this regard, for example, during service, the modules 32 can be swapped in/out. Each module 32 can provide any power, such as 400 kw or any other suitable amount of power, such that when stacked together (e.g., 4 or 5 modules), total power can be about 2 Megawatts on the elongated shaft 10. In embodiments, motors 30 and inverters 29 can be coupled together and positioned to share the same thermal interface so a motor casing of the motors 30 is also an inverter heat sink so only a single cooling loop goes through motor assembly 28 for cooling the inverters 29 and the motors 30 at the same time. This reduces the number of cooling loops and therefore the complexity of the system.

Integrated hydrogen-electric engine system 1 further includes a controller 200 (e.g., a full authority digital engine (or electronics) control (e.g., a FADEC) for controlling the various aspects of the integrated hydrogen-electric engine system 1 and/or other components of aircraft system. For instance, controller 200 can be configured to manage a flow of liquid hydrogen, manage coolant liquids from the motor assembly 28, manage, for example, any dependent auxiliary heater for the liquid hydrogen, manage rates of hydrogen going into fuel cell stack 26, manage rates of heated/cooled compressed air, and/or various flows and/or power of integrated hydrogen-electric engine system 1. The algorithm for managing these thermal management components can be designed to ensure the most efficient use of the various cooling and heating capacities of the respective gases and liquids to maximize the efficiency of the system and minimize the volume and weight of same. For example, the cooling capacity of liquid hydrogen or cool hydrogen gas (post-gasification) can be effectively used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 3:
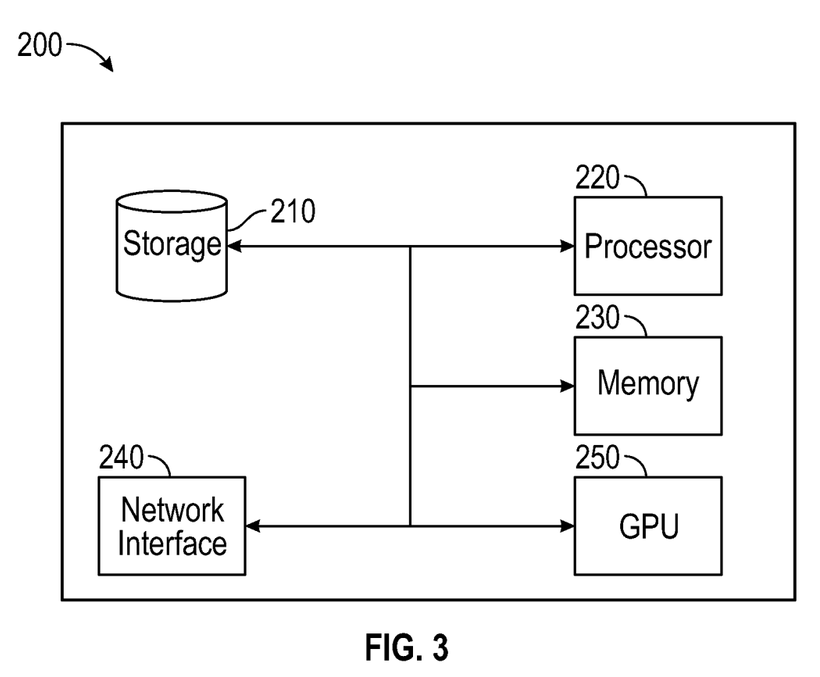
FIG. 3 is a block diagram of a controller configured for use with integrated hydrogen-electric engine system of FIG. 1.

FIG. 3 illustrates that controller 200 includes a processor 220 connected to a computer-readable storage medium or a memory 230. The computer-readable storage medium or memory 230 may be a volatile type memory, e.g., RAM, or a non-volatile type memory, e.g., flash media, disk media, etc. In various aspects of the disclosure, the processor 220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

The controller 200 is configured to receive among other data, the fuel supply status, aircraft location, and control, among other features, the pumps, motors, sensors, etc.

Further, as can be appreciated, the integrated hydrogen-electric engine system 1 can include any number and/or type of sensors, electrical components, and/or telemetry devices that are operatively coupled to controller 200 for facilitating the control, operation, and/or input/out of the various components of integrated hydrogen-electric engine system 1 for improving efficiencies and/or determining errors and/or failures of the various components.

It should be understood that the disclosed structure can include any suitable mechanical, electrical, and/or chemical components for operating the disclosed system or components thereof. For instance, such electrical components can include, for example, any suitable electrical and/or electromechanical, and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various embodiments, the memory can be random access memory, read-only memory, magnetic disk memory, solid state memory, optical disc memory, and/or another type of memory. In various embodiments, the memory can be separate from the controller and can communicate with the processor through communication buses of a circuit board and/or through communication cables such as serial ATA cables or other types of cables. The memory includes computer-readable instructions that are executable by the processor to operate the controller. In various embodiments, the controller may include a wireless network interface to communicate with other computers or a server. In embodiments, a storage device may be used for storing data. In various embodiments, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In embodiments where the controller is remote, it is contemplated that the controller may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IOT device, or a server system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. An integrated hydrogen-electric engine
comprising: an air compressor system configured to provide
compressed air;
a hydrogen fuel source;
a fuel cell stack;
a heat exchanger in fluid communication with the hydrogen fuel source and the fuel cell stack, wherein the heat exchanger is configured to cool the compressed air before the compressed air enters the fuel cell stack;
an elongated shaft, said elongated shaft having the air compressor system, the fuel cell stack, and the heat exchanger disposed thereon such that said elongated shaft physically supports said air compressor system, said fuel cell stack, and said heat exchanger; wherein the fuel cell stack is disposed concentrically about the elongated shaft; and
a motor assembly disposed in electrical communication with the fuel cell stack.

2. The integrated hydrogen-electric engine of claim 1, wherein the motor assembly includes at least one motor that is disposed in coaxial alignment with the elongated shaft.

3. The integrated hydrogen-electric engine of claim 2, wherein the at least one motor is actuatable to rotate the elongated shaft.

4. The integrated hydrogen-electric engine of claim 3, wherein rotation of the at least one motor causes the air compression system to compress air for transmitting the compressed air to the heat exchanger.

5. The integrated hydrogen-electric engine of claim 2, wherein the motor assembly includes at least one inverter disposed in electrical communication with the at least one motor and the fuel cell stack.

6. The integrated hydrogen-electric engine of claim 5, wherein the inverter converts direct current from the fuel cell stack into alternating current that actuates the at least one motor.

7. The integrated hydrogen-electric engine of claim 1, further comprising a propulsor supported on a distal end of the elongated shaft.

8. The integrated hydrogen-electric engine of claim 1, wherein the air compressor system includes a plurality of spaced-apart compressor wheels that rotate in response to rotation of the elongated shaft.

9. The integrated hydrogen-electric engine of claim 1, wherein the air compressor system includes a compressor that is mechanically coupled to the elongated shaft via a gearbox.

10. The integrated hydrogen-electric engine of claim 1, further comprising a pump in fluid communication with the hydrogen fuel source and the heat exchanger, the pump configured to pump liquid hydrogen from the hydrogen fuel source to the heat exchanger.

11. The integrated hydrogen-electric engine of claim 1, further comprising a controller disposed in electrical communication with at least one of the air compressor system, the hydrogen fuel source, the fuel cell stack, the heat exchanger, or the motor assembly.

12. The integrated hydrogen-electric engine of claim 1, wherein the motor assembly includes a plurality of motors and a plurality of inverters.

13. The integrated hydrogen-electric engine of claim 12, wherein at least one inverter of the plurality of inverters is disposed between two motors of the plurality of motors to define a motor subassembly.

14. The integrated hydrogen-electric engine of claim 12, wherein at least one motor of the plurality of motors and at least one inverter of the plurality of inverters are thermally interfaced.

15. The integrated hydrogen-electric engine of claim 1, wherein the heat exchanger is further configured to cool the compressed air using, at least in part, fuel from the fuel source.

16. The integrated hydrogen-electric engine of claim 1, wherein the heat exchanger is further configured to heat fuel from the fuel source using, at least in part, the compressed air.

17. The integrated hydrogen-electric engine of claim 1, wherein the motor assembly comprises a plurality of interchangeable and removable fuel cell stack modules configured to match the power of the motor assembly.

18. An integrated hydrogen-electric engine comprising:
an air compressor system;
a hydrogen fuel source;
a fuel cell stack comprising a proton membrane exchange fuel cell;
a heat exchanger operatively coupled to both the hydrogen fuel source and the fuel cell stack, wherein the heat exchanger is configured to cool compressed air received from the air compressor system before the compressed air enters the fuel cell stack; and
a motor assembly disposed in electrical communication with the fuel cell stack.

19. The integrated hydrogen-electric engine of claim 18 further comprising:
an elongated shaft, wherein the elongated shaft physically supports the air compressor system, the fuel cell stack, and the heat exchanger.

20. The integrated hydrogen-electric engine of claim 19, wherein the fuel cell stack is disposed concentrically about the elongated shaft.

21. The integrated hydrogen-electric engine of claim 18, wherein the motor assembly includes a plurality of motors and a plurality of inverters.

22. The integrated hydrogen-electric engine of claim 21, wherein at least one motor of the plurality of motors and at least one inverter of the plurality of inverters are thermally interfaced.

23. The integrated hydrogen-electric engine of claim 18, wherein the heat exchanger is further configured to cool the compressed air using, at least in part, fuel from the fuel source.

24. The integrated hydrogen-electric engine of claim 18, wherein the heat exchanger is further configured to heat fuel from the fuel source using, at least in part, the compressed air.

25. The integrated hydrogen-electric engine of claim 18, wherein the motor assembly comprises a plurality of interchangeable and removable fuel cell stack modules configured to match the power of the motor assembly.

26. An integrated hydrogen-electric engine comprising:
an air compressor system;
a hydrogen fuel source;
a fuel cell stack; and
a unified heat exchanger operatively coupled to both the hydrogen fuel source and the fuel cell stack, wherein the unified heat exchanger is configured to both:

cool compressed air received from the air compressor system before the compressed air enters the fuel cell stack, and heat fuel from the hydrogen fuel source before the fuel enters the fuel cell stack.

27. The integrated hydrogen-electric engine of claim 26 further comprising:

an elongated shaft, wherein the elongated shaft physically supports the air compressor system, the fuel cell stack, and the heat exchanger.

28. The integrated hydrogen-electric engine of claim 27, wherein the fuel cell stack is disposed concentrically about the elongated shaft.

29. The integrated hydrogen-electric engine of claim 26 further comprising:

a motor assembly disposed in electrical communication with the fuel cell stack, wherein the motor assembly includes a plurality of motors and a plurality of inverters.

30. The integrated hydrogen-electric engine of claim 29, wherein at least one motor of the plurality of motors and at least one inverter of the plurality of inverters are thermally interfaced.

31. The integrated hydrogen-electric engine of claim 26, wherein the motor assembly comprises a plurality of interchangeable and removable fuel cell stack modules configured to match the power of the motor assembly.

32. The integrated hydrogen-electric engine of claim 26, wherein the unified heat exchanger is further configured to cool the compressed air at least in part by transferring heat from the compressed air to the fuel.

33. The integrated hydrogen-electric engine of claim 26, wherein the unified heat exchanger is further configured to heat fuel from the fuel source at least in part by transferring heat from the compressed air to the fuel.

* * * * *